US010222803B2

United States Patent
Prasad

(10) Patent No.: US 10,222,803 B2
(45) Date of Patent: Mar. 5, 2019

(54) DETERMINING OBJECTS OF INTEREST FOR ACTIVE CRUISE CONTROL

(71) Applicant: Aptiv Technologies Limited, St. Michael (BB)

(72) Inventor: Premchand Krishna Prasad, Carmel, IN (US)

(73) Assignee: Aptiv Technologies Limited (BB)

(*) Notice: Subject to any disclaimer, the term of this patent is extended or adjusted under 35 U.S.C. 154(b) by 0 days.

(21) Appl. No.: 15/612,100

(22) Filed: Jun. 2, 2017

(65) Prior Publication Data

US 2018/0348768 A1    Dec. 6, 2018

(51) Int. Cl.
| | | |
|---|---|---|
| G05D 1/02 | (2006.01) | |
| G01S 7/41 | (2006.01) | |
| G01S 13/42 | (2006.01) | |
| G01S 13/86 | (2006.01) | |
| G01S 13/93 | (2006.01) | |
| G08G 1/16 | (2006.01) | |

(52) U.S. Cl.
CPC ........... *G05D 1/0214* (2013.01); *G01S 7/411* (2013.01); *G01S 13/42* (2013.01); *G01S 13/867* (2013.01); *G01S 13/931* (2013.01); *G05D 1/0246* (2013.01); *G05D 1/0257* (2013.01); *G08G 1/165* (2013.01); *G08G 1/166* (2013.01); *G01S 2013/9375* (2013.01)

(58) Field of Classification Search
CPC combination set(s) only.
See application file for complete search history.

(56) References Cited

U.S. PATENT DOCUMENTS

| | | | |
|---|---|---|---|
| 7,592,945 B2 | 9/2009 | Colburn et al. | |
| 2003/0002713 A1 | 1/2003 | Chen | |
| 2004/0046646 A1* | 3/2004 | Eskridge | G08G 1/017 340/425.5 |
| 2008/0189039 A1* | 8/2008 | Sadekar | G08G 1/096716 701/301 |
| 2009/0228204 A1* | 9/2009 | Zavoli | G01C 21/30 701/532 |
| 2012/0130628 A1 | 5/2012 | Dintzer et al. | |
| 2016/0252611 A1 | 9/2016 | Guecker et al. | |

FOREIGN PATENT DOCUMENTS

| | | |
|---|---|---|
| CN | 101334475 A | 12/2008 |
| JP | 2014-6071 A | 1/2014 |

* cited by examiner

*Primary Examiner* — Peter D Nolan
*Assistant Examiner* — Ana D Thomas
(74) *Attorney, Agent, or Firm* — Joseph V. Bonadies

(57) ABSTRACT

An object-detection system suitable for use on an autonomous vehicle includes a camera, a radar-sensor, and a controller. The camera detects a travel-lane of a roadway traveled by a host-vehicle. The radar-sensor detects targets in a field-of-view of the radar-sensor. The field-of-view includes the roadway, wherein the roadway defines a boundary of the roadway detected by the radar-sensor. The controller is in communication with the camera and the radar-sensor. The controller determines that a collection of targets is a stationary-object that defines a line. The controller classifies the stationary-object as an overpass when the line extends beyond the boundary of the roadway. The controller classifies the stationary-object as an impediment when the line overlays a portion of the travel-lane traveled by the host-vehicle and does not extend beyond the boundary of the roadway.

15 Claims, 7 Drawing Sheets

US 10,222,803 B2

DETERMINING OBJECTS OF INTEREST FOR ACTIVE CRUISE CONTROL

TECHNICAL FIELD OF INVENTION

This disclosure generally relates to an object detection system, and more particularly relates to an object detection system for use with active cruise control.

BACKGROUND OF INVENTION

It is known that an overpass over a roadway may be detected by two-dimensional radar-systems as a false target due to the inability of the radar systems to determine elevation. Detection of false targets may disable an active cruise control system leading to increased operator annoyance.

SUMMARY OF THE INVENTION

In accordance with one embodiment, an object-detection system suitable for use on an autonomous vehicle is provided. The object-detection system includes a camera, a radar-sensor, and a controller. The camera detects a travel-lane of a roadway traveled by a host-vehicle. The radar-sensor detects targets in a field-of-view of the radar-sensor. The field-of-view includes the roadway, wherein the roadway defines a boundary of the roadway detected by the radar-sensor. The controller is in communication with the camera and the radar-sensor. The controller determines that a collection of targets is a stationary-object that defines a line. The controller classifies the stationary-object as an overpass when the line extends beyond the boundary of the roadway. The controller classifies the stationary-object as an impediment when the line overlays a portion of the travel-lane traveled by the host-vehicle and does not extend beyond the boundary of the roadway.

In another embodiment, a method for detecting an object suitable for use in an automated vehicle is provided. The method includes detecting a travel-lane, detecting targets, determining stationary-objects, and classifying stationary-objects. The step of detecting a travel-lane may include detecting, with a camera, the travel-lane of a roadway traveled by a host-vehicle. The step of detecting targets may include detecting, with a radar-sensor, targets in a field-of-view of the radar-sensor. The field-of-view includes the roadway, wherein the roadway defines a boundary of the roadway detected by the radar-sensor. The step of determining stationary-objects may include determining, with a controller in communication with the camera and the radar-sensor, that a collection of targets is the stationary-object that defines a line. The step of classifying stationary-objects may include classifying, with the controller, the stationary-object as an overpass when the line extends beyond the boundary of the roadway, and classifying the stationary-object as an impediment when the line overlays a portion of the travel-lane traveled by the host-vehicle and does not extend beyond the boundary of the roadway.

In yet another embodiment, an object-detection system is provided. The object-detection system includes a camera, a radar-sensor, and a controller. The controller is in communication with the camera and the radar-sensor. The controller determines that a collection of targets is an overpass when a line defined by the collection of targets extends beyond a boundary of a roadway. The controller determines that an impediment exists when the line overlays a portion of a travel-lane and does not extend beyond the boundary of the roadway.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
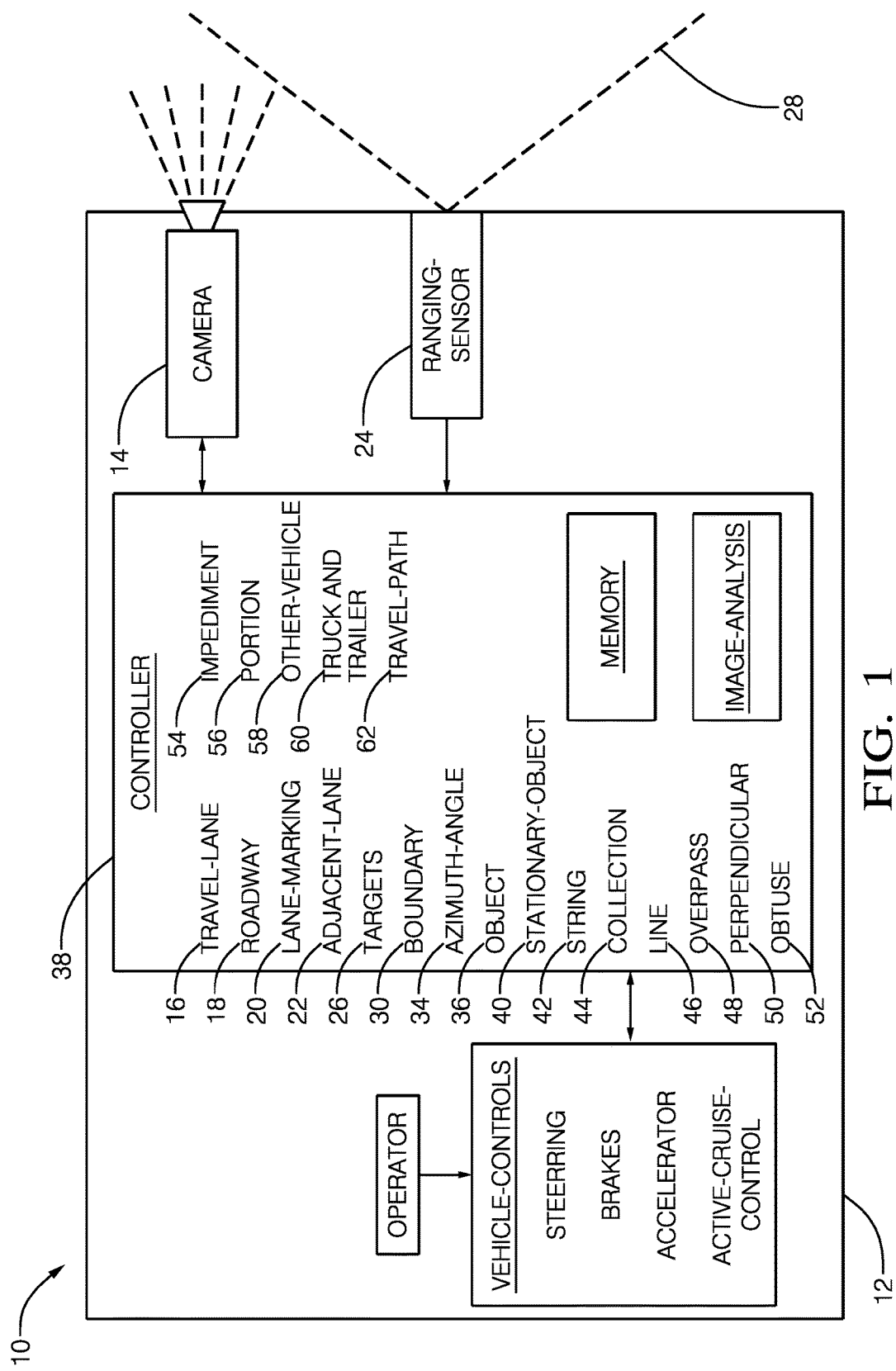
FIG. 1 is an illustration of an object-detection system in accordance with one embodiment.

FIG. 1 illustrates a non-limiting example of an object-detection system 10, hereafter referred to as the system 10, suitable for use on an automated vehicle 12, hereafter referred to as a host-vehicle 12. The system 10 includes a camera 14 that detects a travel-lane 16 of a roadway 18 traveled by the host-vehicle 12. As will be described in more detail below, the system 10 is an improvement over prior object detection systems because the system 10 is configured to differentiate between an overhead structure and an obstacle on the roadway 18. Examples of the camera 14 suitable for use on the host-vehicle 12 are commercially available as will be recognized by those in the art, one such being the APTINA MT9V023 from Micron Technology, Inc. of Boise, Id., USA. The camera 14 may be mounted on the front of the host-vehicle 12, or mounted in the interior of the host-vehicle 12 at a location suitable for the camera 14 to view the area around the host-vehicle 12 through the windshield of the host-vehicle 12. The camera 14 is preferably a video-type camera 14 or camera 14 that can capture images of the roadway 18 and surrounding area at a sufficient frame-rate, of ten frames per second, for example. The travel-lane 16 may be defined by lane-markings 20, or may be defined by edges of pavement if no lane-markings 20 are detected. The image may include, but is not limited to, a lane-marking 20 on a left-side and a right-side of the travel-lane 16 of the roadway 18 traveled by the host-vehicle 12 (see FIG. 2). The image may also include the lane-marking 20 in an adjacent-lane 22. The lane-marking 20 may include a solid-line, a dashed-line, or any combination thereof.

The system 10 also includes a radar-sensor 24 that detects targets 26 in a field-of-view 28 of the radar-sensor 24. The field-of-view 28 may include the roadway 18 (FIG. 2), wherein the roadway 18 defines a boundary 30 of the roadway 18 detected by the radar-sensor 24. Typically, radar-systems on vehicles are capable of only determining a range 32, a range-rate (not shown), and azimuth-angle 34 (e.g. left/right angle) to the target 26 so may be referred to as a two-dimensional (2D) radar-system. Other radar-systems are capable of determining an elevation-angle (not shown) to the target 26 so may be referred to as a three-dimensional (3D) radar-system. In the non-limiting example illustrated in FIG. 1, the radar-sensor 24 is a 2D radar-sensor 24 and may include a left-sensor (not shown) and a right-sensor (not shown). A radar-sensor-system with a similarly configured radar-sensor 24 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 24. The radar-sensor 24 is generally configured to detect a reflection of a radar-signal (not shown) that may include data indicative of the detected target 26 proximate to the host-vehicle 12. As used herein, the detected target 26 may be an object 36 that is detected by the radar-sensor 24 and tracked by a controller 38, as will be described below.

By way of example and not limitation, the radar-sensor 24 may be configured to output a continuous or periodic data stream that includes a variety of signal characteristics associated with each target 26 detected. The signal characteristics may include or be indicative of, but are not limited to, the range 32 to the target 26 from the host-vehicle 12, the azimuth-angle 34 to the target 26 relative to a host-vehicle-longitudinal-axis (not specifically shown), an amplitude (not shown) of the radar-signal detected by the radar-sensor 24, and a relative-velocity of closure (i.e. the range-rate) relative to the target 26.

Figure 2:
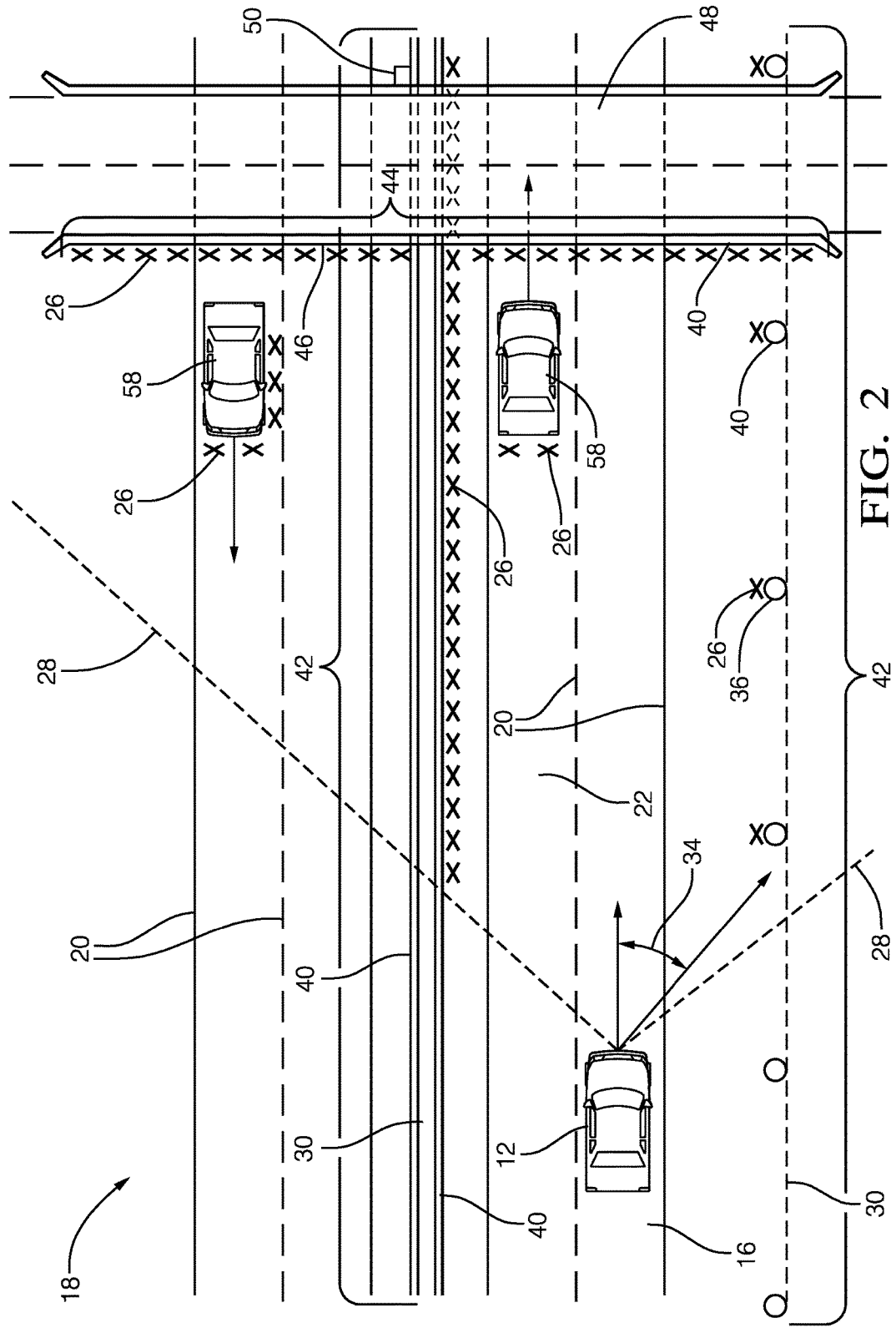
FIG. 2 is an illustration of a host-vehicle equipped with the object-detection system of FIG. 1 in accordance with one embodiment.

As illustrated in FIG. 2, the boundary 30 of the roadway 18 may be defined by a plurality of stationary-objects 40 arranged in a string 42 parallel to and outside the travel-lane 16. The boundary 30 may be comprised of the stationary-objects 40 detected by the radar-sensor 24 including, but not limited to, guard-rails, sign-posts, fencing, power-poles, lamp-posts, and distance-markers. As used herein, the stationary-object 40 is the object 36 with the range-rate equal to the negative value of a host-vehicle-velocity (not shown), as will be understood by those in the art. Where the roadway 18 is featureless (i.e. absent of any significant stationary-objects 40 proximate to the roadway 18 as may be found in desert areas, for example), a fixed boundary-width (not shown) of the boundary 30 may be used and may be based on a type of roadway 18 (i.e. local, freeway, etc.) and a number of lanes (not specifically shown). For example, a minimum shoulder width in accordance with The U.S Department of Transportation, Federal Highway Administration's Safety guidelines may be used as the fixed boundary-width, where the minimum shoulder width may vary from 0.6 meters (0.6 m) to 2.4 m for a rural roadway 18, and may vary from 1.2 m to 3.6 m for a freeway.

The system 10 also includes the controller 38 in communication with the camera 14 and the radar-sensor 24 (FIG. 1). The controller 38 may include a processor (not shown) such as a microprocessor or other control circuitry such as analog and/or digital control circuitry including an application specific integrated circuit (ASIC) for processing data as should be evident to those in the art. The controller 38 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 36 is going to be in the intended path of the host-vehicle 12 based on signals received by the controller 38 from the radar-sensor 24 as described herein.

The controller 38 may receive the image, via a video-signal (not shown), and may determine both a lane-width (not specifically shown) and a centerline (not shown) of the travel-lane 16 based on the lane-marking 20. That is, the image detected or captured by the camera 14 is processed by the controller 38 using known techniques for image-analysis to determine where along the roadway 18 the host-vehicle 12 should be operated or be steered. Vision processing technologies, such as the EYE Q® platform from Moblieye Vision Technologies, Ltd. of Jerusalem, Israel, or other suitable devices may be used. By way of example and not limitation, the centerline is preferably in the middle of the travel-lane 16 traveled by the host-vehicle 12.

The controller 38 may analyze the radar-signal to categorize the data from each detected target 26 with respect to a list of previously detected targets 26 having established tracks. As used herein, a track refers to one or more data sets that have been associated with a particular one of the detected targets 26. By way of example and not limitation, if the amplitude of the radar-signal is above a predetermined amplitude threshold, then the controller 38 determines if the data corresponds to a previously detected target 26 or if a new-target has been detected. If the data corresponds to a previously detected target 26, the data is added to or combined with prior data to update the track of the previously detected target 26. If the data does not correspond to any previously detected target 26 because, for example, it is located too far away from any previously detected target 26, then it may be characterized as a new-target and assigned a unique track identification number. The identification number may be assigned according to the order that data for a new detected target 26 is received, or may be assigned an identification number according to a grid-location (not shown) in the field-of-view 28.

Figure 3:
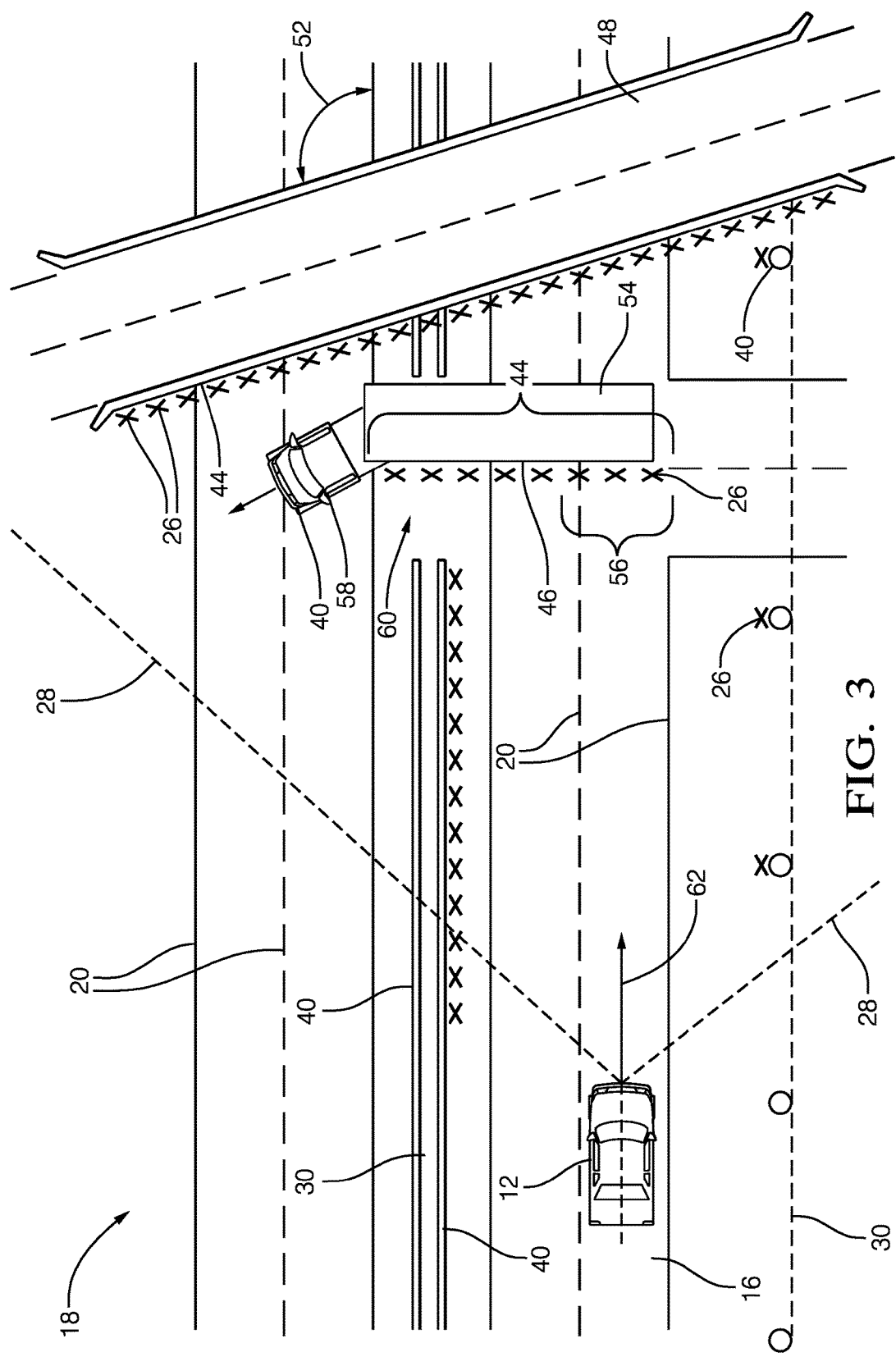
FIG. 3 is an illustration of the host-vehicle of FIG. 2 equipped with the object-detection system of FIG. 1 in accordance with one embodiment.

As illustrated in FIG. 2, the controller 38 may determine that a collection 44 of targets 26 is the stationary-object 40 that defines a line 46. The line 46 may be a straight-line (not specifically shown) or a curved-line (not shown). The controller 38 may use any of the known methods for determining the line 46 including, but not limited to a least squares method, as will be recognized by one skilled in the art. The controller 38 may classify the stationary-object 40 as an overpass 48 when the line 46 extends beyond the boundary 30 of the roadway 18. The overpass 48 may cross the roadway 18 at an angle perpendicular 50 to the roadway 18 (FIG. 2), or may cross the roadway 18 at an obtuse 52 angle (FIG. 3). The controller 38 may utilize additional logical checks to support the classification of the overpass 48, such as determining that leading-vehicles and/or oncoming-vehicles (not specifically shown) traveling on the roadway 18 are crossing the line 46, and/or detecting that the boundary 30 (e.g. guard-rail) crosses the line 46, and/or detecting moving-vehicles traveling on the overpass 48, for example. With the stationary-object 40 classified as the overpass 48, the controller 38 may prevent an automatic disengagement of an active-cruise-control (not specifically shown), and/or may prevent an automatic engagement of a braking-actuator (not shown).

As illustrated in FIG. 3, the controller 38 may classify the stationary-object 40 as an impediment 54 when the line 46 overlays a portion 56 of the travel-lane 16 traveled by the host-vehicle 12 and does not extend beyond the boundary 30 of the roadway 18. This situation may arise when an other-vehicle 58, such as a combination truck and trailer 60, may be turning in front of the host-vehicle 12, or may be stopped on the roadway 18 in a direction transverse and/or non-parallel to a travel-path 62 of the host-vehicle 12. With the stationary-object 40 classified as the impediment 54, the controller 38 may automatically disengage the active-cruise-control, and/or may automatically engage the braking-actuator to prevent a collision with the impediment 54.

Figure 4:
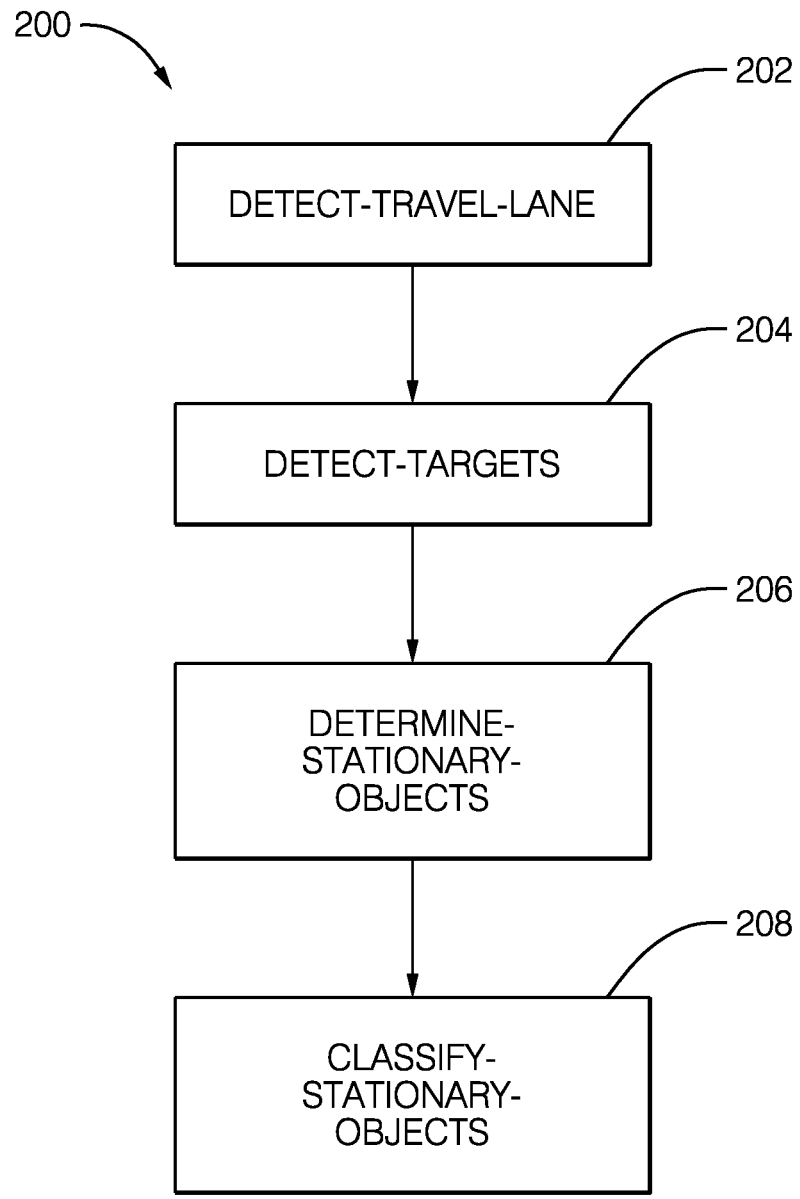
FIG. 4 is a flow chart of a method of operating an object-detection system in accordance with another embodiment.

FIG. 4 illustrates a non-limiting example of another embodiment of method 200 for operating an object-detection system 10, hereafter referred to as the system 10, suitable for use on an automated vehicle 12, hereafter referred to as a host-vehicle 12. The method 200 includes the steps of detecting a travel-lane 16, detecting targets 26, determining stationary-objects 40, and classifying stationary-objects 40.

Step 202, DETECT-TRAVEL-LANE, may include detecting, with a camera 14, a travel-lane 16 of a roadway 18 traveled by the host-vehicle 12. As will be described in more detail below, the system 10 is an improvement over prior object detection systems because the system 10 is configured to differentiate between an overhead structure and an obstacle on the roadway 18. Examples of the camera 14 suitable for use on the host-vehicle 12 are commercially available as will be recognized by those in the art, one such being the APTINA MT9V023 from Micron Technology, Inc. of Boise, Id., USA. The camera 14 may be mounted on the front of the host-vehicle 12, or mounted in the interior of the host-vehicle 12 at a location suitable for the camera 14 to view the area around the host-vehicle 12 through the windshield of the host-vehicle 12. The camera 14 is preferably a video-type camera 14 or camera 14 that can capture images of the roadway 18 and surrounding area at a sufficient frame-rate, of ten frames per second, for example. The travel-lane 16 may be defined by lane-markings 20, or may be defined by edges of pavement if no lane-markings 20 are detected. The image may include, but is not limited to, a lane-marking 20 on a left-side and a right-side of the travel-lane 16 of the roadway 18 traveled by the host-vehicle 12 (see FIG. 2). The image may also include the lane-marking 20 in an adjacent-lane 22. The lane-marking 20 may include a solid-line, a dashed-line, or any combination thereof.

Step 204, DETECT-TARGETS, may include detecting, with a radar-sensor 24, targets 26 in a field-of-view 28 of the radar-sensor 24. The field-of-view 28 may include the roadway 18 (FIG. 2), wherein the roadway 18 defines a boundary 30 of the roadway 18 detected by the radar-sensor 24. Typically, radar-systems on vehicles are capable of only determining a range 32, a range-rate (not shown), and azimuth-angle 34 (e.g. left/right angle) to the target 26 so may be referred to as a two-dimensional (2D) radar-system. Other radar-systems are capable of determining an elevation-angle (not shown) to the target 26 so may be referred to as a three-dimensional (3D) radar-system. In the non-limiting example illustrated in FIG. 1, the radar-sensor 24 is a 2D radar-sensor 24 and may include a left-sensor (not shown) and a right-sensor (not shown). A radar-sensor-system with a similarly configured radar-sensor 24 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 24. The radar-sensor 24 is generally configured to detect a reflection of a radar-signal (not shown) that may include data indicative of the detected target 26 proximate to the host-vehicle 12. As used herein, the detected target 26 may be an object 36 that is detected by the radar-sensor 24 and tracked by a controller 38, as will be described below.

By way of example and not limitation, the radar-sensor 24 may be configured to output a continuous or periodic data stream that includes a variety of signal characteristics associated with each target 26 detected. The signal characteristics may include or be indicative of, but are not limited to, the range 32 to the target 26 from the host-vehicle 12, the azimuth-angle 34 to the target 26 relative to a host-vehicle-longitudinal-axis (not specifically shown), an amplitude (not shown) of the radar-signal detected by the radar-sensor 24, and a relative-velocity of closure (i.e. the range-rate) relative to the target 26.

As illustrated in FIG. 2, the boundary 30 of the roadway 18 may be defined by a plurality of stationary-objects 40 arranged in a string 42 parallel to and outside the travel-lane 16. The boundary 30 may be comprised of the stationary-objects 40 detected by the radar-sensor 24 including, but not limited to, guard-rails, sign-posts, fencing, power-poles, lamp-posts, and distance-markers. As used herein, the stationary-object 40 is the object 36 with the range-rate equal to the negative value of a host-vehicle-velocity (not shown), as will be understood by those in the art. Where the roadway 18 is featureless (i.e. absent of any significant stationary-objects 40 proximate to the roadway 18 as may be found in desert areas, for example), a fixed boundary-width (not shown) of the boundary 30 may be used and may be based on a type of roadway 18 (i.e. local, freeway, etc.) and a number of lanes (not specifically shown). For example, a minimum shoulder width in accordance with The U.S Department of Transportation, Federal Highway Administration's Safety guidelines may be used as the fixed boundary-width, where the minimum shoulder width may vary from 0.6 meters (0.6 m) to 2.4 m for a rural roadway 18, and may vary from 1.2 m to 3.6 m for a freeway.

Step 206, DETERMINE-STATIONARY-OBJECTS, may include determining, with the controller 38 in communication with the camera 14 and the radar-sensor 24, that a collection 44 of targets 26 is a stationary-object 40 that defines a line 46. The controller 38 may include a processor (not shown) such as a microprocessor or other control circuitry such as analog and/or digital control circuitry including an application specific integrated circuit (ASIC) for processing data as should be evident to those in the art. The controller 38 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 36 is going to be in the intended path of the host-vehicle 12 based on signals received by the controller 38 from the radar-sensor 24 as described herein.

The controller 38 may receive the image, via a video-signal (not shown), and may determine both a lane-width (not specifically shown) and a centerline (not shown) of the travel-lane 16 based on the lane-marking 20. That is, the image detected or captured by the camera 14 is processed by the controller 38 using known techniques for image-analysis to determine where along the roadway 18 the host-vehicle 12 should be operated or be steered. Vision processing technologies, such as the EYE Q® platform from Moblieye Vision Technologies, Ltd. of Jerusalem, Israel, or other suitable devices may be used. By way of example and not limitation, the centerline is preferably in the middle of the travel-lane 16 traveled by the host-vehicle 12.

The controller 38 may analyze the radar-signal to categorize the data from each detected target 26 with respect to a list of previously detected targets 26 having established tracks. As used herein, a track refers to one or more data sets that have been associated with a particular one of the detected targets 26. By way of example and not limitation, if the amplitude of the radar-signal is above a predetermined amplitude threshold, then the controller 38 determines if the data corresponds to a previously detected target 26 or if a new-target has been detected. If the data corresponds to a previously detected target 26, the data is added to or combined with prior data to update the track of the previously detected target 26. If the data does not correspond to any previously detected target 26 because, for example, it is located too far away from any previously detected target 26, then it may be characterized as a new-target and assigned a unique track identification number. The identification number may be assigned according to the order that data for a new detected target 26 is received, or may be assigned an identification number according to a grid-location (not shown) in the field-of-view 28.

As illustrated in FIG. 2, the controller 38 may determine that the collection 44 of targets 26 is the stationary-object 40 that defines the line 46. The line 46 may be a straight-line (not specifically shown) or a curved-line (not shown). The controller 38 may use any of the known methods for determining the line 46 including, but not limited to a least squares method, as will be recognized by one skilled in the art.

Step 208, CLASSIFY-STATIONARY-OBJECTS, may include classifying the stationary-object 40 as an overpass 48 when the line 46 extends beyond the boundary 30 of the roadway 18. The overpass 48 may cross the roadway 18 at an angle perpendicular 50 to the roadway 18 (FIG. 2), or may cross the roadway 18 at an obtuse 52 angle (FIG. 3). The controller 38 may utilize additional logical checks to support the classification of the overpass 48, such as determining that leading-vehicles and/or oncoming-vehicles (not specifically shown) traveling on the roadway 18 are crossing the line 46, and/or detecting that the boundary 30 (e.g. guard-rail) crosses the line 46, for example. With the stationary-object 40 classified as the overpass 48, the controller 38 may prevent an automatic disengagement of an active-cruise-control (not specifically shown), and/or may prevent an automatic engagement of a braking-actuator (not shown).

As illustrated in FIG. 3, the controller 38 may classify the stationary-object 40 as an impediment 54 when the line 46 overlays a portion 56 of the travel-lane 16 traveled by the host-vehicle 12 and does not extend beyond the boundary 30 of the roadway 18. This situation may arise when an other-vehicle 58, such as a combination truck and trailer 60, may be turning in front of the host-vehicle 12, or may be stopped on the roadway 18 in a direction transverse and/or non-parallel to a travel-path 62 of the host-vehicle 12. With the stationary-object 40 classified as the impediment 54, the controller 38 may automatically disengage the active-cruise-control, and/or may automatically engage the braking-actuator to prevent a collision with the impediment 54.

Figure 5:
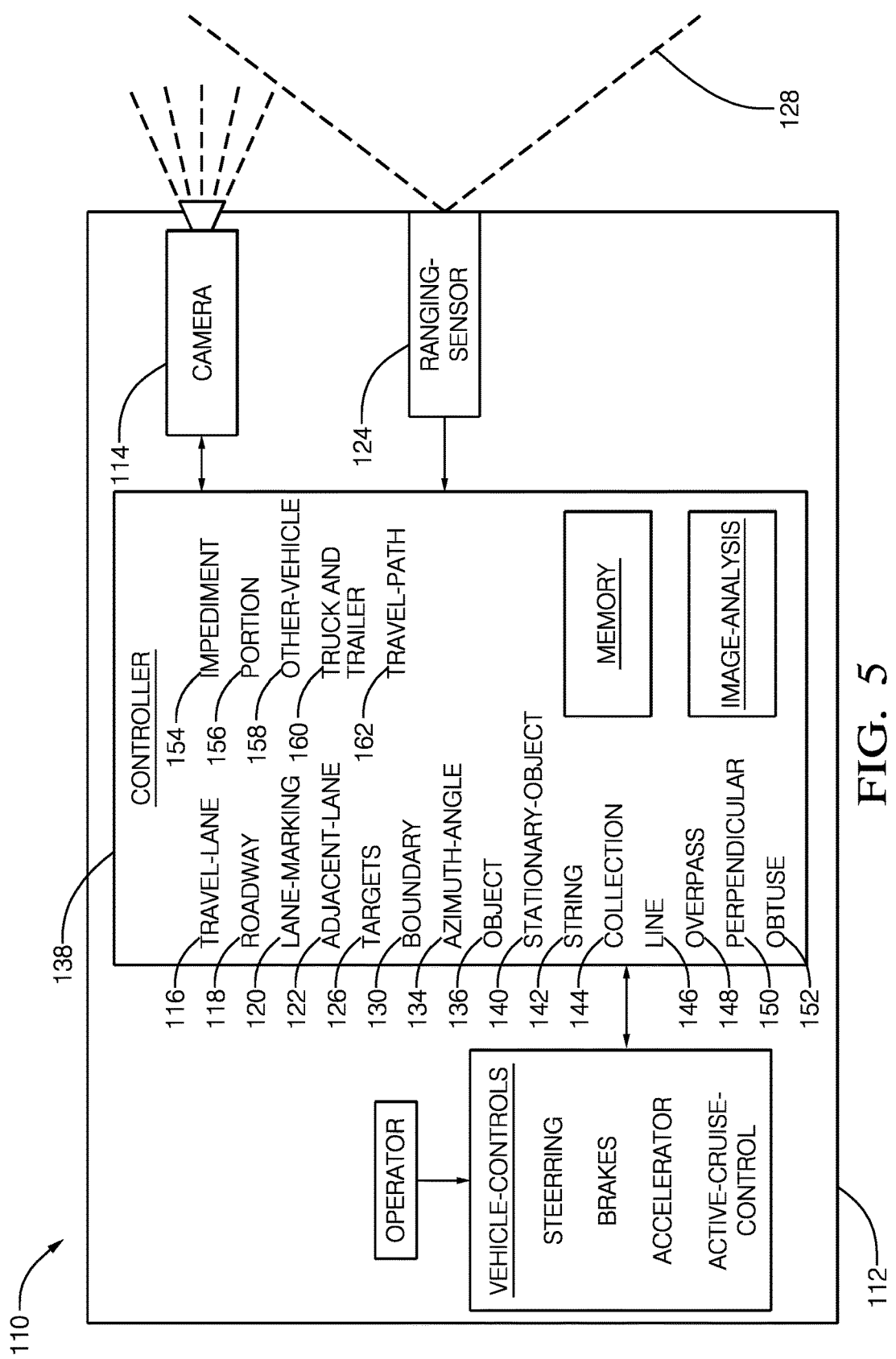
FIG. 5 is an illustration of an object-detection system in accordance with yet another embodiment.

FIG. 5 illustrates a non-limiting example of yet another embodiment of an object-detection system 110, hereafter referred to as the system 110, suitable for use on an automated vehicle 112, hereafter referred to as a host-vehicle 112. As will be described in more detail below, the system 110 is an improvement over prior object detection systems because the system 110 is configured to differentiate between an overhead structure and an obstacle on the roadway 118. The system 110 includes a camera 114 that detects a travel-lane 116 of a roadway 118 traveled by the host-vehicle 112. Examples of the camera 114 suitable for use on the host-vehicle 112 are commercially available as will be recognized by those in the art, one such being the APTINA MT9V023 from Micron Technology, Inc. of Boise, Id., USA. The camera 114 may be mounted on the front of the host-vehicle 112, or mounted in the interior of the host-vehicle 112 at a location suitable for the camera 114 to view the area around the host-vehicle 112 through the windshield of the host-vehicle 112. The camera 114 is preferably a video-type camera 114 or camera 114 that can capture images of the roadway 118 and surrounding area at a sufficient frame-rate, of ten frames per second, for example. The travel-lane 116 may be defined by lane-markings 120, or may be defined by edges of pavement if no lane-markings 120 are detected. The image may include, but is not limited to, a lane-marking 120 on a left-side and a right-side of the travel-lane 116 of the roadway 118 traveled by the host-vehicle 112 (see FIG. 6). The image may also include the lane-marking 120 in an adjacent-lane 122. The lane-marking 120 may include a solid-line, a dashed-line, or any combination thereof.

The system 110 also includes a radar-sensor 124 that detects targets 126 in a field-of-view 128 of the radar-sensor 124. The field-of-view 128 may include the roadway 118 (FIG. 6), wherein the roadway 118 defines a boundary 130 of the roadway 118 detected by the radar-sensor 124. Typically, radar-systems on vehicles are capable of only determining a range 132, a range-rate (not shown), and azimuth-angle 134 (e.g. left/right angle) to the target 126 so may be referred to as a two-dimensional (2D) radar-system. Other radar-systems are capable of determining an elevation-angle (not shown) to the target 126 so may be referred to as a three-dimensional (3D) radar-system. In the non-limiting example illustrated in FIG. 5, the radar-sensor 124 is a 2D radar-sensor 124 and may include a left-sensor (not shown) and a right-sensor (not shown). A radar-sensor-system with a similarly configured radar-sensor 124 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 124. The radar-sensor 124 is generally configured to detect a reflection of a radar-signal (not shown) that may include data indicative of the detected target 126 proximate to the host-vehicle 112. As used herein, the detected target 126 may be an object 136 that is detected by the radar-sensor 124 and tracked by a controller 138, as will be described below.

By way of example and not limitation, the radar-sensor 124 may be configured to output a continuous or periodic data stream that includes a variety of signal characteristics associated with each target 126 detected. The signal characteristics may include or be indicative of, but are not limited to, the range 132 to the target 126 from the host-vehicle 112, the azimuth-angle 134 to the target 126 relative to a host-vehicle-longitudinal-axis (not specifically shown), an amplitude (not shown) of the radar-signal detected by the radar-sensor 124, and a relative-velocity of closure (i.e. the range-rate) relative to the target 126.

Figure 6:
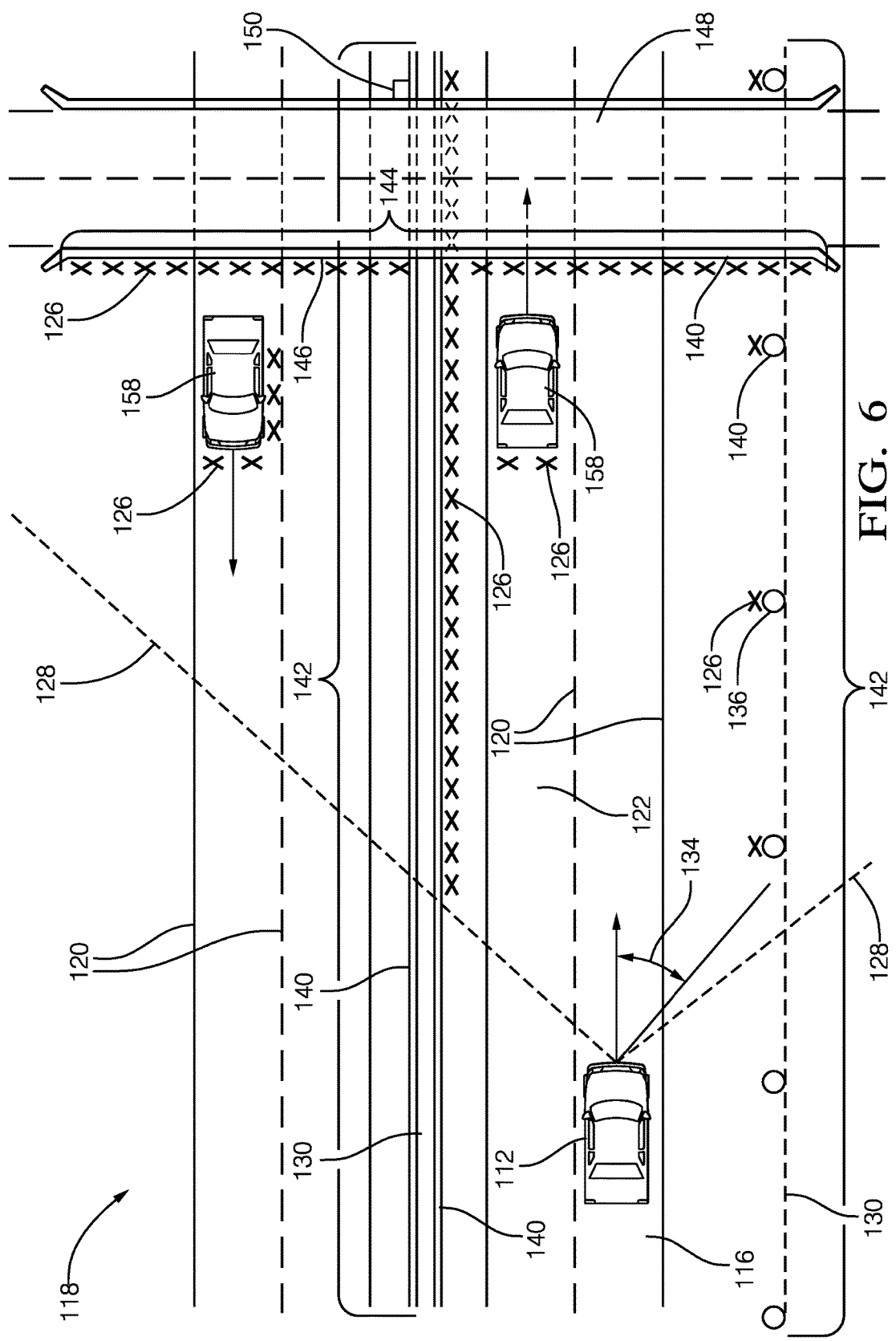
FIG. 6 is an illustration of a host-vehicle equipped with the object-detection system of FIG. 5 in accordance with yet another embodiment.

As illustrated in FIG. 6, the boundary 130 of the roadway 118 may be defined by a plurality of stationary-objects 140 arranged in a string 142 parallel to and outside the travel-lane 116. The boundary 130 may be comprised of the stationary-objects 140 detected by the radar-sensor 124 including, but not limited to, guard-rails, sign-posts, fencing, power-poles, lamp-posts, and distance-markers. As used herein, the stationary-object 140 is the object 136 with the range-rate equal to the negative value of a host-vehicle-velocity (not shown), as will be understood by those in the art. Where the roadway 118 is featureless (i.e. absent of any significant stationary-objects 140 proximate to the roadway 118 as may be found in desert areas, for example), a fixed boundary-width (not shown) of the boundary 130 may be used and may be based on a type of roadway 118 (i.e. local, freeway, etc.) and a number of lanes (not specifically shown). For example, a minimum shoulder width in accordance with The U.S Department of Transportation, Federal Highway Administration's Safety guidelines may be used as the fixed boundary-width, where the minimum shoulder width may vary from 0.6 meters (0.6 m) to 2.4 m for a rural roadway 118, and may vary from 1.2 m to 3.6 m for a freeway.

The system 110 also includes the controller 138 in communication with the camera 114 and the radar-sensor 124 (FIG. 1). The controller 138 may include a processor (not shown) such as a microprocessor or other control circuitry such as analog and/or digital control circuitry including an application specific integrated circuit (ASIC) for processing data as should be evident to those in the art. The controller 138 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 136 is going to be in the intended path of the host-vehicle 112 based on signals received by the controller 138 from the radar-sensor 124 as described herein.

The controller 138 may receive the image, via a video-signal (not shown), and may determine both a lane-width (not specifically shown) and a centerline (not shown) of the travel-lane 116 based on the lane-marking 120. That is, the image detected or captured by the camera 114 is processed by the controller 138 using known techniques for image-analysis to determine where along the roadway 118 the host-vehicle 112 should be operated or be steered. Vision processing technologies, such as the EYE Q® platform from Moblieye Vision Technologies, Ltd. of Jerusalem, Israel, or other suitable devices may be used. By way of example and not limitation, the centerline is preferably in the middle of the travel-lane 116 traveled by the host-vehicle 112.

The controller 138 may analyze the radar-signal to categorize the data from each detected target 126 with respect to a list of previously detected targets 126 having established tracks. As used herein, a track refers to one or more data sets that have been associated with a particular one of the detected targets 126. By way of example and not limitation, if the amplitude of the radar-signal is above a predetermined amplitude threshold, then the controller 138 determines if the data corresponds to a previously detected target 126 or if a new-target has been detected. If the data corresponds to a previously detected target 126, the data is added to or combined with prior data to update the track of the previously detected target 126. If the data does not correspond to any previously detected target 126 because, for example, it is located too far away from any previously detected target 126, then it may be characterized as a new-target and assigned a unique track identification number. The identification number may be assigned according to the order that data for a new detected target 126 is received, or may be assigned an identification number according to a grid-location (not shown) in the field-of-view 128.

Figure 7:
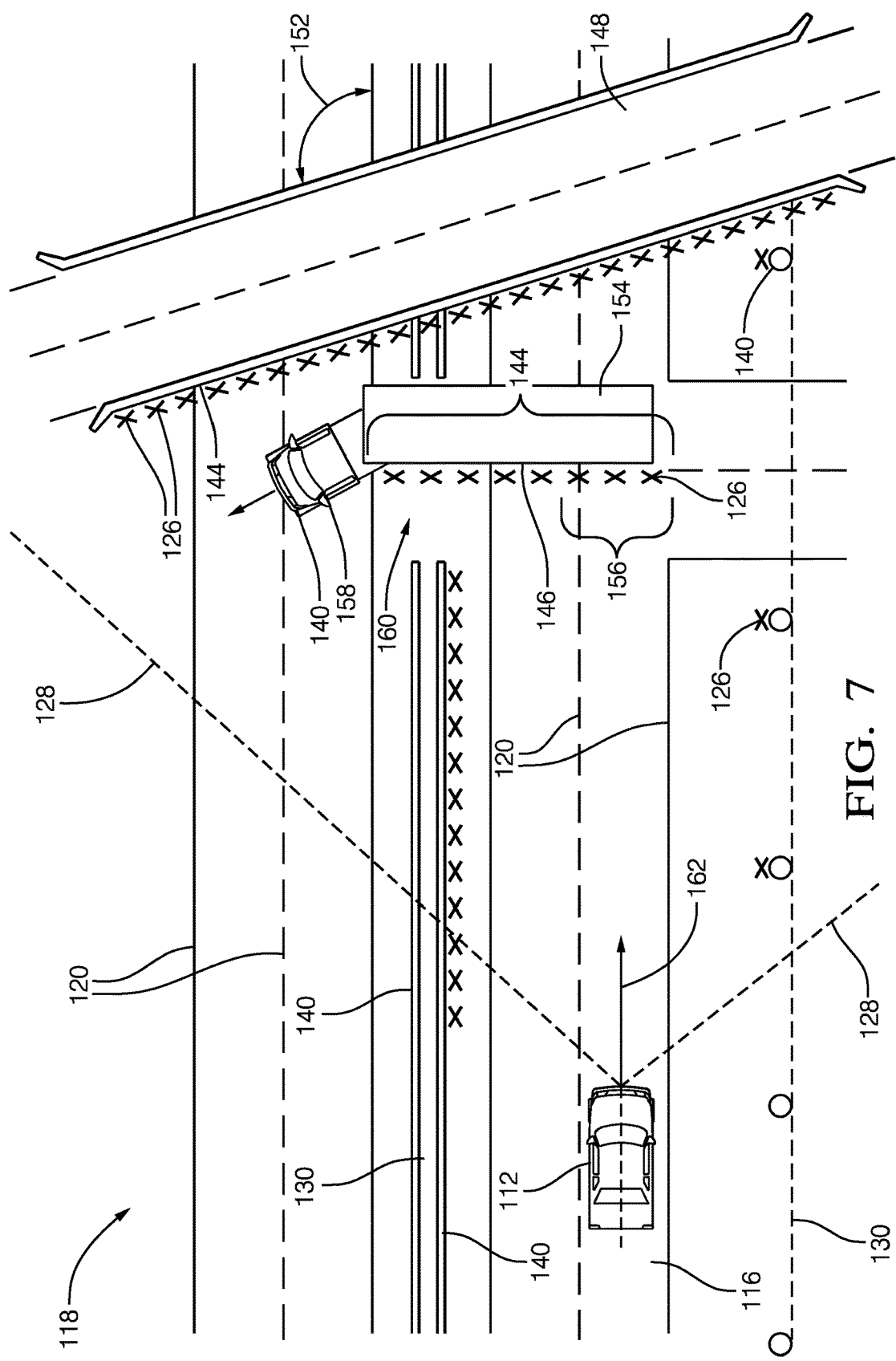
FIG. 7 is an illustration of the host-vehicle of FIG. 6 equipped with the object-detection system of FIG. 5 in accordance with yet another embodiment.

As illustrated in FIG. 6, the controller 138 may determine that a collection 144 of targets 126 is the stationary-object 140 that defines a line 146. The line 146 may be a straight-line (not specifically shown) or a curved-line (not shown). The controller 138 may use any of the known methods for determining the line 146 including, but not limited to a least squares method, as will be recognized by one skilled in the art. The controller 138 may classify the stationary-object 140 as an overpass 148 when the line 146 extends beyond the boundary 130 of the roadway 118. The overpass 148 may cross the roadway 118 at an angle perpendicular 150 to the roadway 118 (FIG. 6), or may cross the roadway 118 at an obtuse 152 angle (FIG. 7). The controller 138 may utilize additional logical checks to support the classification of the overpass 148, such as determining that leading-vehicles and/or oncoming-vehicles (not specifically shown) traveling on the roadway 118 are crossing the line 146, and/or detecting that the boundary 130 (e.g. guard-rail) crosses the line 146, for example. With the stationary-object 140 classified as the overpass 148, the controller 138 may prevent an automatic disengagement of an active-cruise-control (not specifically shown), and/or may prevent an automatic engagement of a braking-actuator (not shown).

As illustrated in FIG. 7, the controller 138 may classify the stationary-object 140 as an impediment 154 when the line 146 overlays a portion 156 of the travel-lane 116 traveled by the host-vehicle 112 and does not extend beyond the boundary 130 of the roadway 118. This situation may arise when an other-vehicle 158, such as a combination truck and trailer 160, may be turning in front of the host-vehicle 112, or may be stopped on the roadway 118 in a direction transverse and/or non-parallel to a travel-path 162 of the host-vehicle 112. With the stationary-object 140 classified as the impediment 154, the controller 138 may automatically disengage the active-cruise-control, and/or may automatically engage the braking-actuator to prevent a collision with the impediment 154.

Accordingly, an object-detection system 10, a controller 38 for the object-detection system 10 and a method 200 of operating the object-detection system is provided. The system 10 is an improvement over prior object detection systems because the system 10 is configured to differentiate between an overpass 48 and an impediment 54, such as a truck and trailer 60 blocking a portion 56 of the travel-lane 16 using the radar-sensor 24. The system 10 may also reduce false interruptions of the active-cruise-control system, preventing an operator from disabling the active-cruise-control.

While this invention has been described in terms of the preferred embodiments thereof, it is not intended to be so limited, but rather only to the extent set forth in the claims that follow.

I claim:

1. An object-detection system suitable for use on an autonomous vehicle, said system comprising:
   a camera that detects a travel-lane of a roadway traveled by a host-vehicle;

a radar-sensor that detects targets in a field-of-view of the radar-sensor, said field-of-view including the roadway, wherein the roadway defines a boundary of the roadway detected by the radar-sensor; and a controller in communication with the camera and the radar-sensor, wherein the controller determines that a collection of targets is a stationary-object that defines a line, classifies the stationary-object as an overpass when the line extends beyond the boundary of the roadway, and classifies the stationary-object as an impediment when the line overlays a portion of the travel-lane traveled by the host-vehicle and does not extend beyond the boundary of the roadway, wherein the impediment is an other-vehicle.

2. The system in accordance with claim 1, wherein the boundary of the roadway is defined by a plurality of the stationary-objects arranged in a string parallel to and outside the travel-lane.

3. The system in accordance with claim 2, wherein the stationary-objects include guard-rails, sign-posts, fencing, power-poles, lamp-posts, and distance-markers.

4. The system in accordance with claim 1, wherein the radar-sensor is a two-dimensional radar-sensor.

5. The system in accordance with claim 1, wherein the overpass crosses the roadway at an angle perpendicular to the roadway.

6. The system in accordance with claim 1, wherein the overpass crosses the roadway at an obtuse angle.

7. The system in accordance with claim 1, wherein the other-vehicle is a combination truck and trailer.

8. A method for detecting an object suitable for use in an automated vehicle, said method comprising:

detecting, with a camera, a travel-lane of a roadway traveled by a host-vehicle;

detecting, with a radar-sensor, targets in a field-of-view of the radar-sensor, said field-of-view including the roadway, wherein the roadway defines a boundary of the roadway detected by the radar-sensor; and determining, with a controller in communication with the camera and the radar-sensor, that a collection of targets is a stationary-object that defines a line, classifies the stationary-object as an overpass when the line extends beyond the boundary of the roadway, and classifies the stationary-object as an impediment when the line overlays a portion of the travel-lane traveled by the host-vehicle and does not extend beyond the boundary of the roadway, wherein the impediment is an other-vehicle.

9. The method in accordance with claim 8, wherein the boundary of the roadway is defined by a plurality of the stationary-objects arranged in a string parallel to and outside the travel-lane.

10. The method in accordance with claim 9, wherein the stationary-objects include guard-rails, sign-posts, fencing, power-poles, lamp-posts, and distance-markers.

11. The method in accordance with claim 8, wherein the radar-sensor is a two-dimensional radar-sensor.

12. The method in accordance with claim 8, wherein the overpass crosses the roadway at an angle perpendicular to the roadway.

13. The method in accordance with claim 8, wherein the overpass crosses the roadway at an obtuse angle.

14. The method in accordance with claim 8, wherein the other-vehicle is a combination truck and trailer.

15. An object-detection system comprising:

a camera;

a radar-sensor; and a controller in communication with the camera and the radar-sensor, wherein the controller determines that a collection of targets is an overpass when a line defined by the collection of targets extends beyond a boundary of a roadway, and determines that a stationary impediment exists when the line overlays a portion of a travel-lane and does not extend beyond the boundary of the roadway, wherein the stationary impediment is an other-vehicle.

* * * * *